(12) United States Patent
Hartranft

(10) Patent No.: US 7,891,097 B2
(45) Date of Patent: Feb. 22, 2011

(54) ARMORED CABLE CUTTER

(75) Inventor: Bruce W. Hartranft, St. Charles, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 486 days.

(21) Appl. No.: 11/959,271

(22) Filed: Dec. 18, 2007

(65) Prior Publication Data

US 2009/0151166 A1    Jun. 18, 2009

(51) Int. Cl.
*B26B 27/00* (2006.01)
(52) U.S. Cl. .......................................... 30/90.3; 30/90.4
(58) Field of Classification Search .................. 30/90.3, 30/90.8, 90.2, 90.4–91.1
See application file for complete search history.

(56) References Cited

U.S. PATENT DOCUMENTS

| 2,819,520 | A | * | 1/1958 | Eyles ........................... 30/90.8 |
| 3,091,031 | A | | 5/1963 | Grant |
| 3,108,373 | A | * | 10/1963 | Ruskin ........................ 30/90.3 |
| 3,114,277 | A | * | 12/1963 | Clendenin ................... 30/90.1 |
| 3,851,387 | A | | 12/1974 | Ducret |
| 4,055,097 | A | | 10/1977 | Ducret |
| 4,103,578 | A | | 8/1978 | Ducret |
| 4,142,290 | A | | 3/1979 | Ducret |
| 4,169,400 | A | | 10/1979 | Ducret |
| 4,267,636 | A | | 5/1981 | Ducret |
| 4,359,819 | A | | 11/1982 | Ducret |
| 4,697,343 | A | | 10/1987 | Collins |
| 4,769,909 | A | | 9/1988 | Ducret |
| 4,884,339 | A | | 12/1989 | Custin |
| 4,977,671 | A | | 12/1990 | Ducret |
| 5,093,992 | A | | 3/1992 | Temple, Jr. et al. |
| 5,337,479 | A | | 8/1994 | Ducret |
| 5,809,652 | A | | 9/1998 | Ducret |
| 6,581,291 | B1 | * | 6/2003 | Tarpill et al. ................. 30/90.4 |
| 2008/0301950 | A1 | | 12/2008 | Harger |

* cited by examiner

*Primary Examiner*—Kenneth E. Peterson
*Assistant Examiner*—Sean Michalski
(74) *Attorney, Agent, or Firm*—Cook Alex Ltd.

(57) ABSTRACT

A cutting tool for cutting the armor includes a cutter body having first and bottom entry walls defining a channel for receiving an armored cable. There is a slot in the first wall that affords reciprocating entry into the channel of a movable cutting blade from the outside of the wall. The direction of translation into the channel defines a blade insertion direction. The slot defines a slot segment of the first wall which in turn defines a base line. A stopper is mounted on the cutter body opposite the slot on the inside of the first wall. The stopper moves toward and away from the first wall to engage an armored cable placed in the channel and releasably press the armored cable against the slot segment of the first wall. The distance in the blade insertion direction of the bottom entry wall from the base line increases as the longitudinal distance from the slot segment increases to impart a curved configuration to the channel.

11 Claims, 5 Drawing Sheets

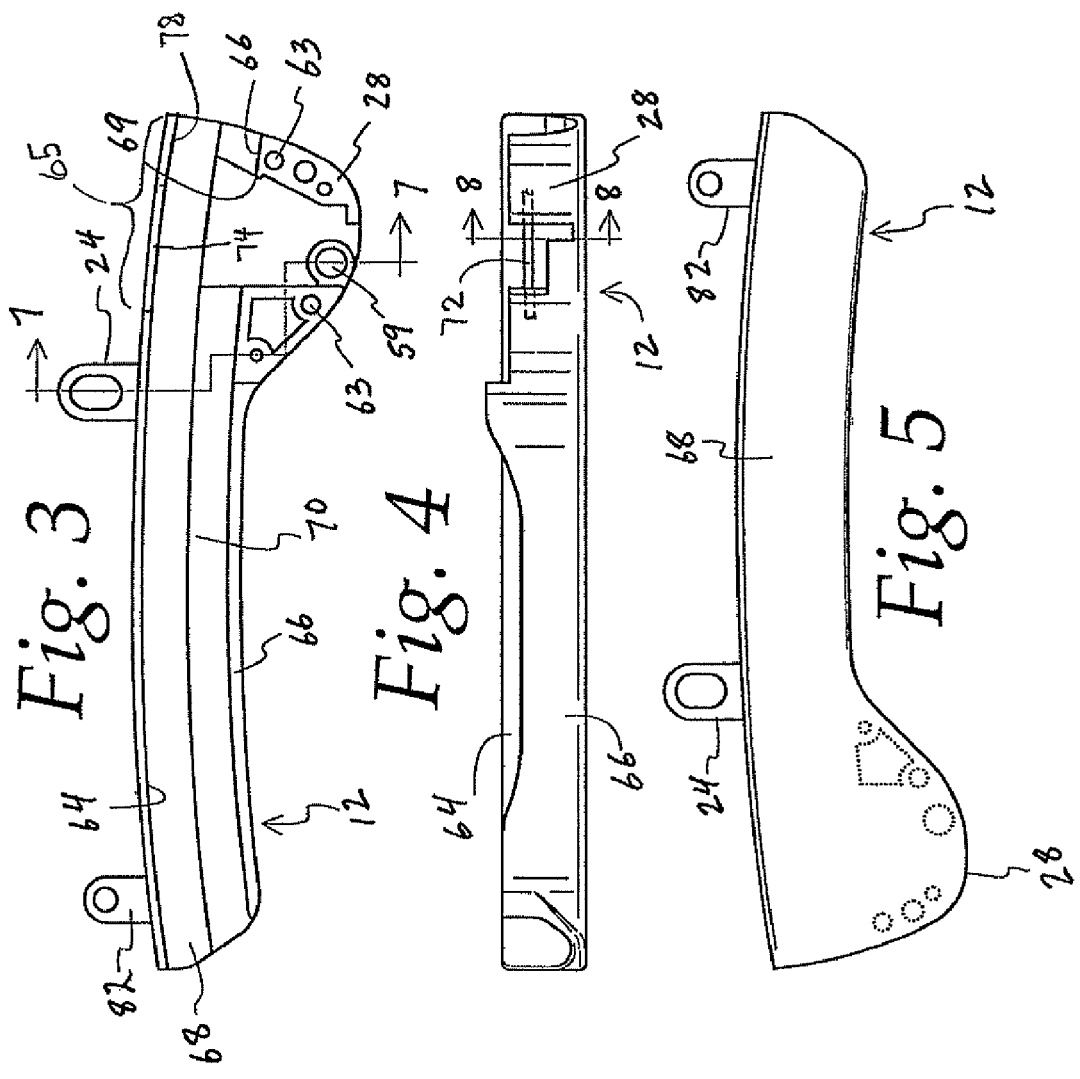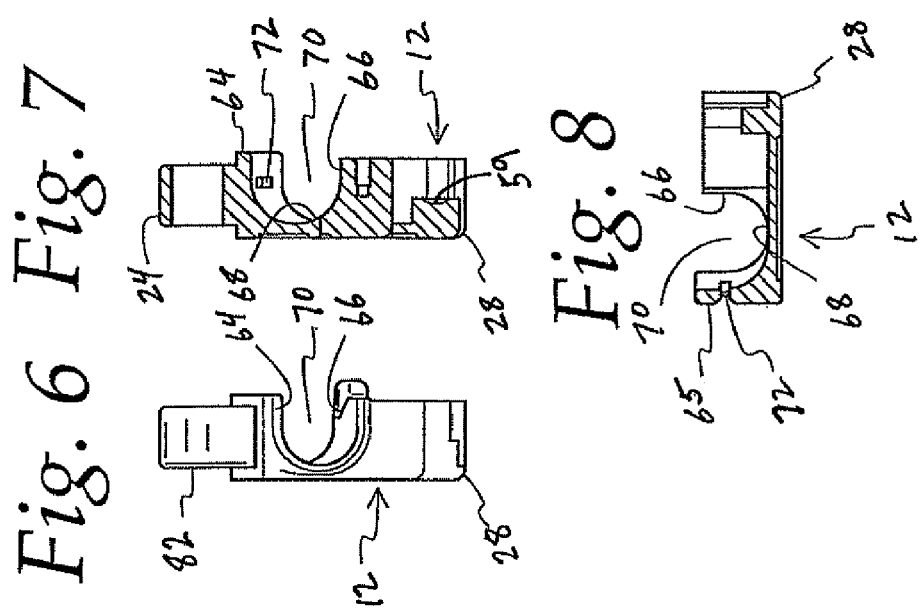

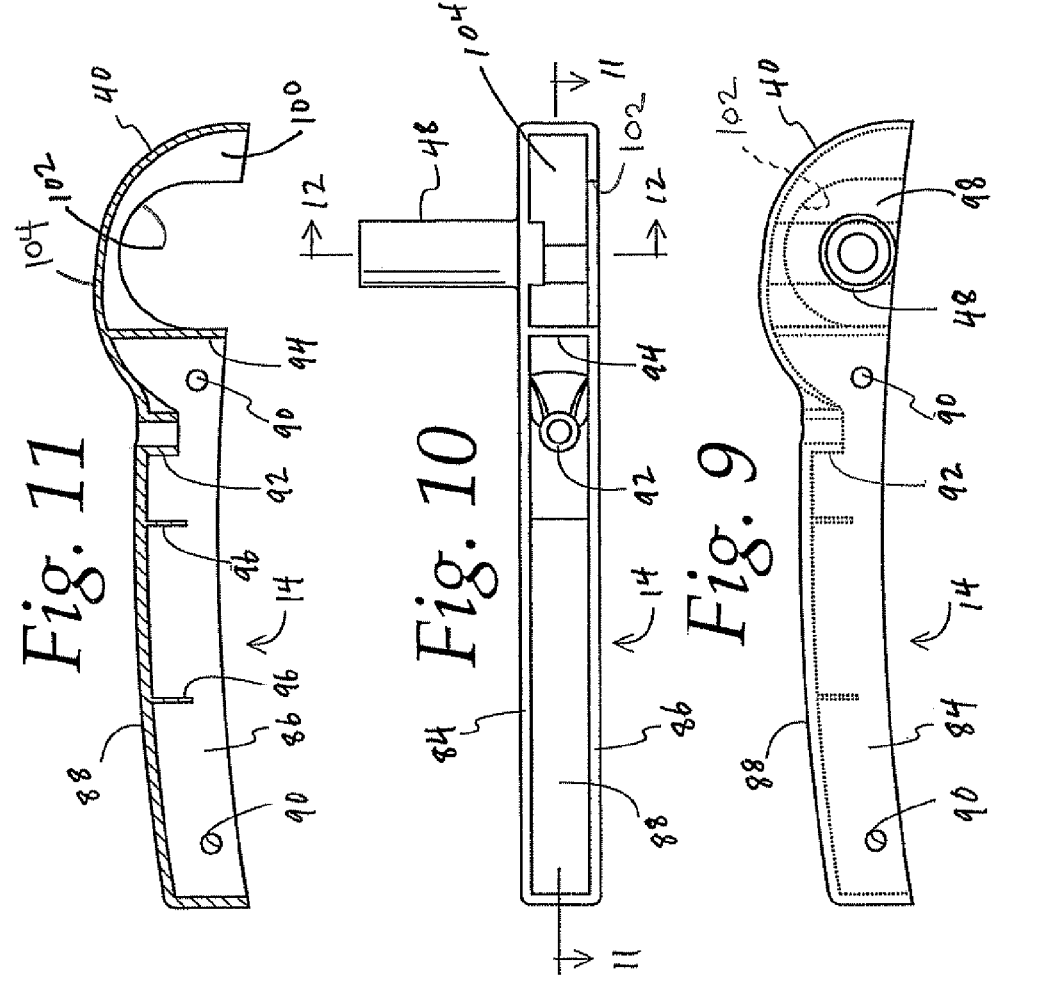
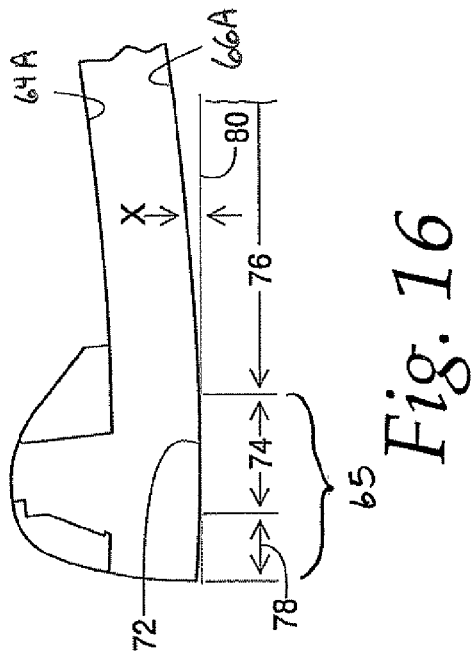
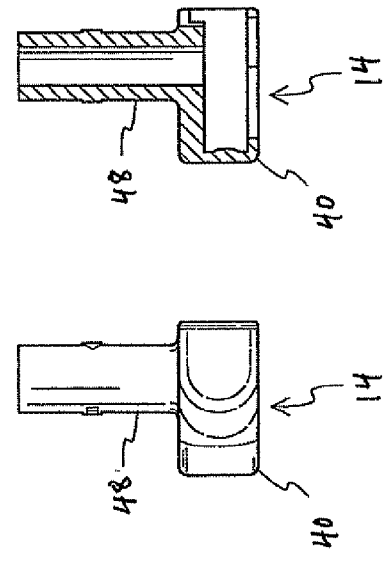

ARMORED CABLE CUTTER

BACKGROUND OF THE INVENTION

The present invention relates to a hand tool for cutting armored cables such as BX, AC, or MC cables. In particular, the invention relates to an improvement in positioning the cable to have its metal casing cut longitudinally by a blade without damage to internal wires or conductors.

Armored cable has a flexible aluminum or steel casing or jacket which protects a plurality of wires or conductors. The steel casing enables the cable to be resistant to damage. Typically, a tubular casing or outer jacket is created by helically winding a strip of aluminum or steel in an interlocking fashion. This method of construction creates grooves in the cable's casing that permit the cable to flex.

Prior art armored cable cutters are shown, for example, in U.S. Pat. No. 3,851,387. The device of the '387 patent has been successful in replacing old cutting methods that rely on general purpose tools such as hacksaws or pliers for crimp cutting or twisting and breaking the armor casing of the cable. The armor on the cables is difficult to cut without slipping and injuring the user if ordinary tools are used. The specialized tool of the U.S. Pat. No. 3,851,387 largely protects the worker from injury. But the cutter blade regularly nicks the insulation of the wires or conductors within the metal casing because the cable is disposed in the tool in a straight or flat orientation.

Any nick or damage to the insulation or conductor can lead to open circuits or shorts. Not only can this damage prevent electrical circuits from operating but it can also be dangerous and lead to an electrical fire. It is therefore important to ensure that when cutting, only the casing is sliced and not the insulation of the internal wires.

SUMMARY OF THE INVENTION

The present invention provides an armored cable cutting tool with an improved curved cable guide channel that allows the cable's armored casing to be cut without touching the internal wires or conductors. The internal wires that run through armored cables typically do not fill the entire space inside the armor casing. Therefore, there is empty space between the armor casing and the internal wires. This extra space allows the wires to move about inside the armor casing. When a cable like the one described is curved, the internal wires migrate to the inside curve of the armored cable. The cutting blade of the tool of the present invention is arranged to penetrate the armor casing on the outside curve of the cable, at a point remote from the migrated internal wires.

The cutter includes a cutter body having a first wall, top and bottom entry walls and a side wall. The walls define a channel for receiving an armored cable therein. There is a slot in the first wall. The slot defines two segments of the first wall, a slot segment and an exit segment. The bottom entry wall is located longitudinally on one side of the slot segment. The exit segment is located longitudinally to the other side of the slot segment. The slot segment of the first wall defines a base line generally parallel or tangent to its center. The bottom entry wall is generally congruent with the top entry wall.

There is a blade handle pivotally connected to the cutter body. A cutting blade is mounted on the blade handle. A crank handle is rotatably mounted on the blade handle and the cutting blade is connected to the crank handle for rotation therewith. Pivoting of the blade handle causes the cutting blade to translate into and out of the channel, through the slot. The direction of translation into the channel defines a blade insertion direction. The distance in the blade insertion direction of the bottom entry wall from the base line increases as the longitudinal distance from the slot segment increases. In a preferred embodiment this results in the channel being curved. By curving an armored cable placed in the channel and making a cut on the armor casing at a point on the outside of the curve, the wires inside the cable casing are biased away from the blade which cuts the casing. This minimizes the likelihood of the blade contacting and nicking the insulation on the wires.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 3 is a front elevation view of the cutter body.

FIG. 4 is a bottom plan view of the cutter body.

FIG. 5 is a rear elevation view of the cutter body

FIG. 6 is an end elevation view of the cutter body.

FIG. 7 is a section taken along line 7-7 of FIG. 3.

FIG. 8 is a section taken along line 8-8 of FIG. 4.

FIG. 9 is a front elevation view of the blade handle.

FIG. 10 is a bottom plan view of the blade handle.

FIG. 11 is a section taken along line 11-11 of FIG. 10.

FIG. 12 is a section taken along line 12-12 of FIG. 10.

FIG. 13 is an end elevation view of the blade handle.

FIG. 16 is a sketch of the cutter body of the alternate embodiment, illustrating the geometry of the walls.

DETAILED DESCRIPTION OF THE INVENTION

Figure 1:
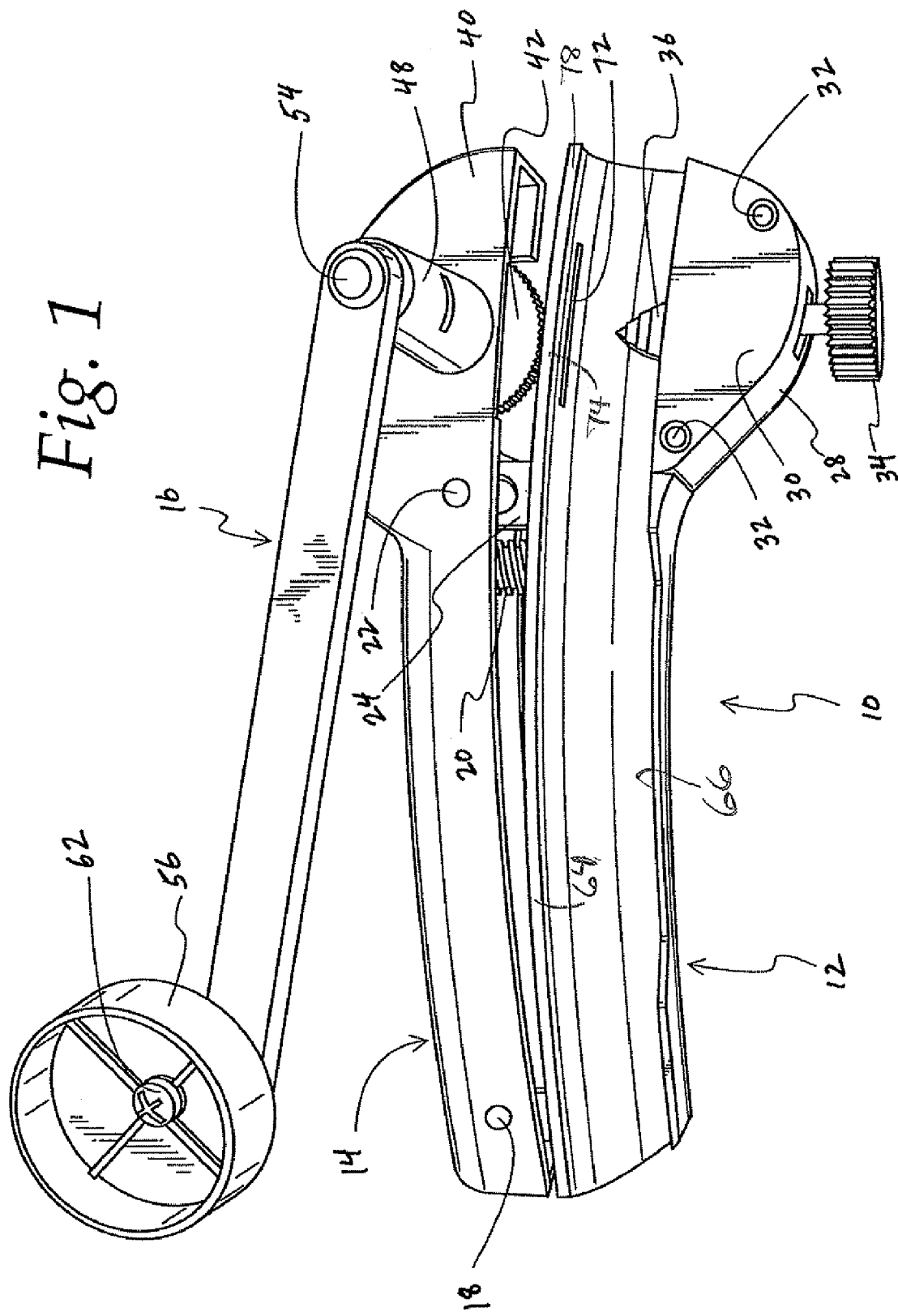
FIG. 1 is a perspective view of an armored cable cutter according to the present invention.
Figure 2:
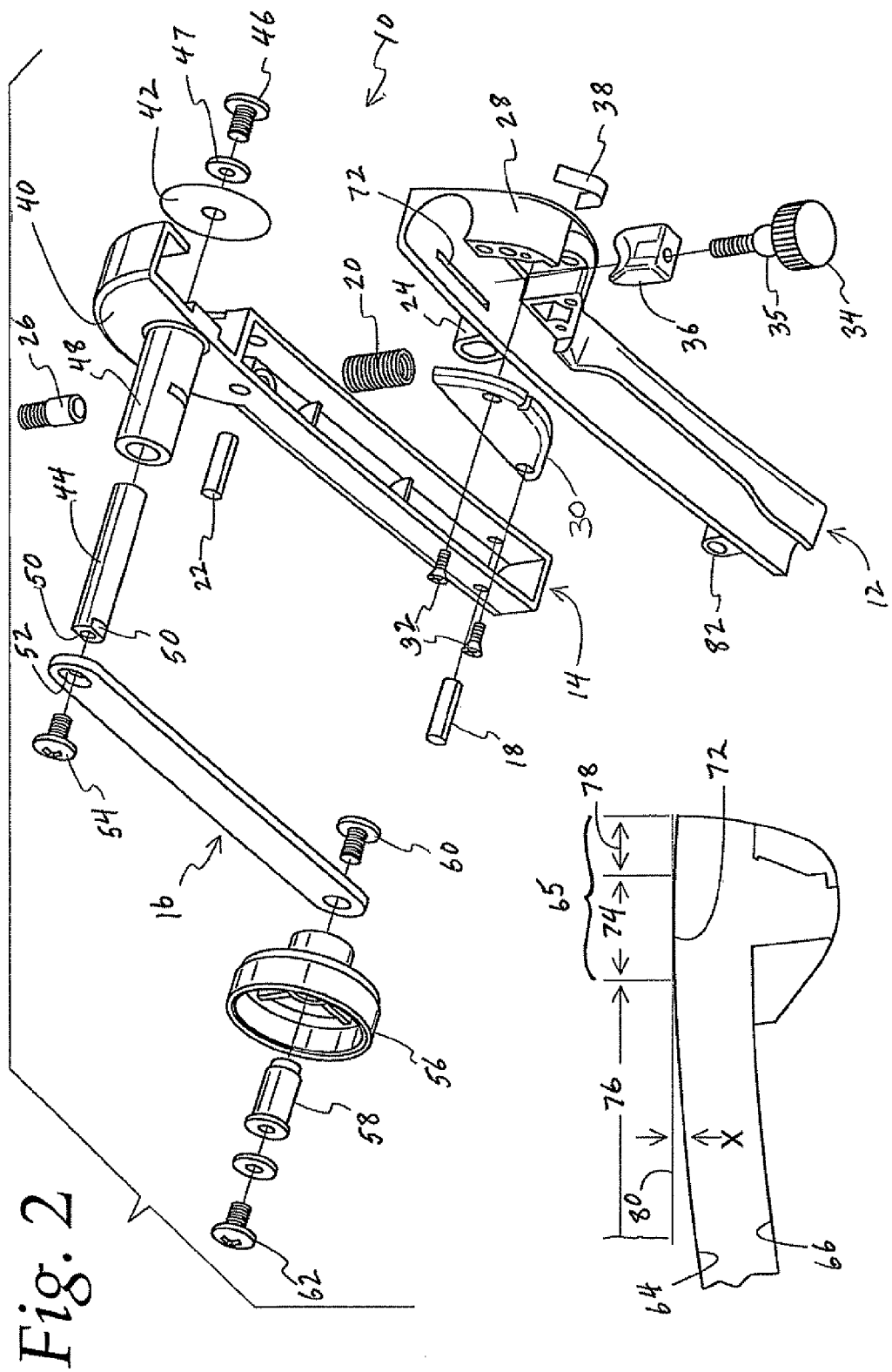
FIG. 2 is an exploded perspective view of the armored cable cutter of the present invention.

FIGS. 1 and 2 generally illustrate a preferred embodiment of the armored cable cutter 10 of the present invention. The cable cutter includes three primary components, a cutter body 12, a blade handle 14 and a crank handle 16. The left hand ends of the cutter body and blade handle, as viewed in FIG. 1, are pivotally connected to one another by a pivot pin 18. The pivot pin allows a user to grasp the cutter body and blade handle in one hand and either close these parts together by a squeezing action or open them by releasing the body and handle. A coil spring 20 is disposed between the cutter body 12 and blade handle 14 to bias them apart, i.e., to an open position. A spring pin 22 extends through the blade handle and engages a shackle 24 formed on the cutter body to limit the extent to which the coil spring 20 can separate the cutter body and blade handle. An adjuster 26 (FIG. 2) is threaded into an opening in the blade handle 14. The adjuster extends into the blade handle where its end is engageable with the underside of the cutter body 12 to limit the extent to which the cutter body and blade handle can be closed on one another.

The right hand end of the cutter body includes an enlarged head portion 28. The head defines a generally hollow cavity. Access to the cavity is provided by a cover plate 30. The cover is held in place by screws 32. The bottom side of the head 28 has a slot which receives an adjustment knob 34. The knob has a shaft which includes a threaded upper portion and a ball 35 just above a knurled gripping surface. The ball is mounted for rotation in the head as will be described below. A stopper 36 is threaded to the shaft of the adjustment knob for vertical movement along the shaft. A leaf spring 38 biases the stopper to the rear of the head cavity. The stopper is movable to releasably restrain a cable during cutting, as will be explained in further detail below.

The right hand end of the blade handle 14 has a head portion 40 which defines a generally hollow cavity. Mounted for rotation in the cavity is a cutting blade. In this embodiment the cutting blade is in the form of a wheel saw 42. The wheel saw is fastened to the end of a saw shaft 44 by a saw mounting screw 46 and washer 47. The saw shaft 44 is mounted for rotation in a bearing sleeve 48 which is fixed to the head portion 40. The outer end of the shaft 44 has a pair of flats 50 that are received within an oval opening 52 near the end of the crank handle 16. Screw 54 fixes the crank handle 16 to the saw shaft 44. The opposite end of the crank handle mounts a knob 56 for rotation on a knob shaft 58. Screw 60 fixes the knob shaft to the handle 16 while screw 62 and the associated washer permit rotation of the knob 56 on the shaft 58.

Details of the cutter body 12 are shown in FIGS. 3-8. The head 28 has a boss with a circular depression 59 formed in the end thereof. A complementary boss and depression (not shown) are formed on the interior of the cover plate 30. Together these bosses loosely entrap the ball 35 of the adjustment knob 34. Cooperating pegs (not shown) on the interior of the cover plate 30 and sockets 63 on the head 28 control the spacing so that the ball 35 is rotatably mounted.

Extending from the head 28 is an arcuate elongated member defined by a top entry wall 64, a bottom entry wall 66, a first wall 65 and a side wall 68. The bottom wall 66 has a gap at 69 in the head portion 28. Together the walls define a three-sided, curved channel 70. The channel has a generally U-shaped cross section, as seen in FIGS. 6-8. The channel 70 receives an armored cable therein for cutting a portion of its outer casing. In this embodiment the top entry wall 64, the first wall 65, and the bottom entry wall 66 are curved or arcuate. It has been found that a radius for the entry walls of about 23 to 24 inches is sufficient to provide the benefits of the present tool. The radius could be otherwise. An acceptable range for the radius of curvature is about 2 to 40 inches. Both entry walls and the first wall are curved in the same direction. That is, the centers of the arcs defined by the walls are on the same side of the tool. This arrangement allows the channel 70 to secure a cable received therein in the required arcuate condition without the need for the user to hold the cable in a particular configuration.

Figure 14:
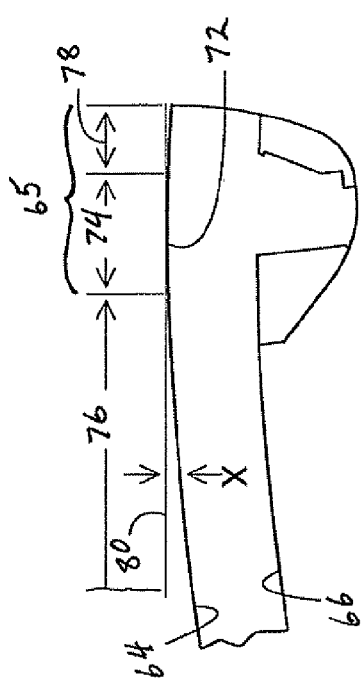
FIG. 14 is a sketch of the cutter body illustrating the geometry of the walls.

The first wall 65 includes a slot 72 cut therethrough. It is located opposite the cutting blade 42. Thus, when a user squeezes the cutter body 12 and blade handle 14 together, the edge of the saw wheel will extend through the slot 72 and penetrate in a blade insertion direction into the channel 70 where it can engage and cut an armored cable disposed in the channel. Looking at FIG. 14, it will be noted that the slot 72 defines two separate segments in the first wall 65. There is a slot segment 74 and an exit segment 78 longitudinally to one (or right) side of the slot segment 74. The top entry wall is also indicated at 76 to the other side (the left side as seen in FIG. 14) of the slot segment 74. The slot segment 74 defines a base line 80. In the illustrated embodiment, which has an arcuate slot segment 74, the base line 80 is tangent to the center point of the slot segment. The blade insertion direction is generally perpendicular to the base line. The distance in the blade insertion direction of the bottom entry wall 66 from the base line increases as the longitudinal distance of the bottom entry wall from the slot segment 74 increases. In the illustrated arrangement, the top entry wall 64 is also spaced downwardly or below the base line 80. This indicated in FIG. 14 by spacing X. The exit segment 78 is similarly spaced below the base line 80, although due to the short length of the exit segment, this spacing is less visible in the figure.

Returning to FIGS. 3-8, extending from the top entry wall 64 are the shackle 24 and a pivot ear 82. The ear receives the pivot pin 18. It will be noted in FIG. 3 that the shackle 24 has an elongated oval slot therethrough. This slot receives the spring pin 22 and limits the amount of pivoting movement between the cutter body 12 and blade handle 14.

Turning now to FIGS. 9-13, details of the blade handle 14 are shown. Like the cutter body 12, the blade handle 14 has a head 40 connected to an elongated member. The elongated member is three-sided like that of the cutter body, but instead of having an open side, the blade handle is open toward the cutter body 12. Thus, there are first and second side walls 84, 86 and a bottom wall 88. Together these walls define a generally U-shaped, hollow elongated member. The side walls have apertures 90 for receiving the pivot pin 18 and the spring pin 22. The bottom wall 88 has a boss 92 formed on the interior thereof. The boss fixes the location of the coil spring 20. The internal bore of the boss is threaded to receive the adjuster 26. A gusset 94 and ribs 96 are provided to strengthen the blade handle. The head portion 40 has a full side wall 98 that merges with side wall 84 and supports the bearing sleeve 48. The head portion also has a partial side wall 100 that merges with side wall 86 and has a U-shaped cutout 102. Walls 98 and 100 are joined by a transverse web 104. It will be understood that the locations of the full side wall and partial side wall could be reversed so that the bearing sleeve 48 could be located on the opposite side of the head portion 40 from that shown. Such an arrangement would reverse the location of the crank handle 16.

The use, operation and function of the cable cutter 10 are as follows. With the cutter body 12 and blade handle in the open position, the cutting blade 42 is retracted from the slot 72 and from the channel 70. The adjustment knob 34 is backed off to pull the stopper 36 largely out of the channel 70. An armored cable to be cut is placed in the channel 70, with the desired location of the cut opposite the center of the slot 72. Then the user advances the adjustment knob 34 so the stopper 36 grips the cable and holds it in place against the slot segment 74 of the first wall 65. It will be noted that the curved channel 70 will place the cutting blade 42 on the outer diameter of the curved cable. Curving the cable in this manner will cause the internal conductors or wires inside the cable's armored casing to migrate toward the inner diameter of the arc, i.e., toward the bottom entry wall 66 of the tool. This migration takes the internal wires out of the path of the wheel saw, which will penetrate the casing from the side of the first wall 65.

With the armored cable secured in the desired arcuate configuration in the channel 70, the user holds the tool in one hand and squeezes the cutter body 12 and blade handle 14 together. As this squeezing motion takes place, the user begins to rotate the crank handle 16 with the other hand. The combination of the squeezing and rotation of the crank handle feeds the cutting blade into the armored cable's outer casing. Rotation of the cutting blade causes it to cut through the casing. Due to the spiral nature of the armored cable's outer casing, once a band of the casing has been cut through, the casing is separated into two pieces, a slug and a main portion. When this happens the user stops rotating and squeezing. The coil spring 20 will open the tool which backs the saw wheel out of the slot 72. The user may then back off the adjustment knob 34 to withdraw the stopper 36 and release the cable. The slug portion of the casing is pulled off and the armored cable is ready for preparation of the internal wires or conductors for the next step in the installation. Since curved channel 70 caused the internal wires or conductors to move out of the saw wheel's path during cutting of the casing, the internal wires will not be nicked or cut during removal of the casing slug.

It will be noted that both entry walls 64 and 66 of the channel are curved in the same direction in order to support that cable in a curved arrangement throughout the entire channel. In this embodiment the top and bottom entry walls are congruent. That is, they have the same radius but their centers are spaced apart. This arrangement ensures that the wires or conductors inside the cable remained biased away from the cutting blade 42. If the cable were not supported by the channel in the curved arrangement, the cable could sag causing the internal wires to migrate closer to the blade saw 42 and ultimately be nicked or damaged.

Figure 15:
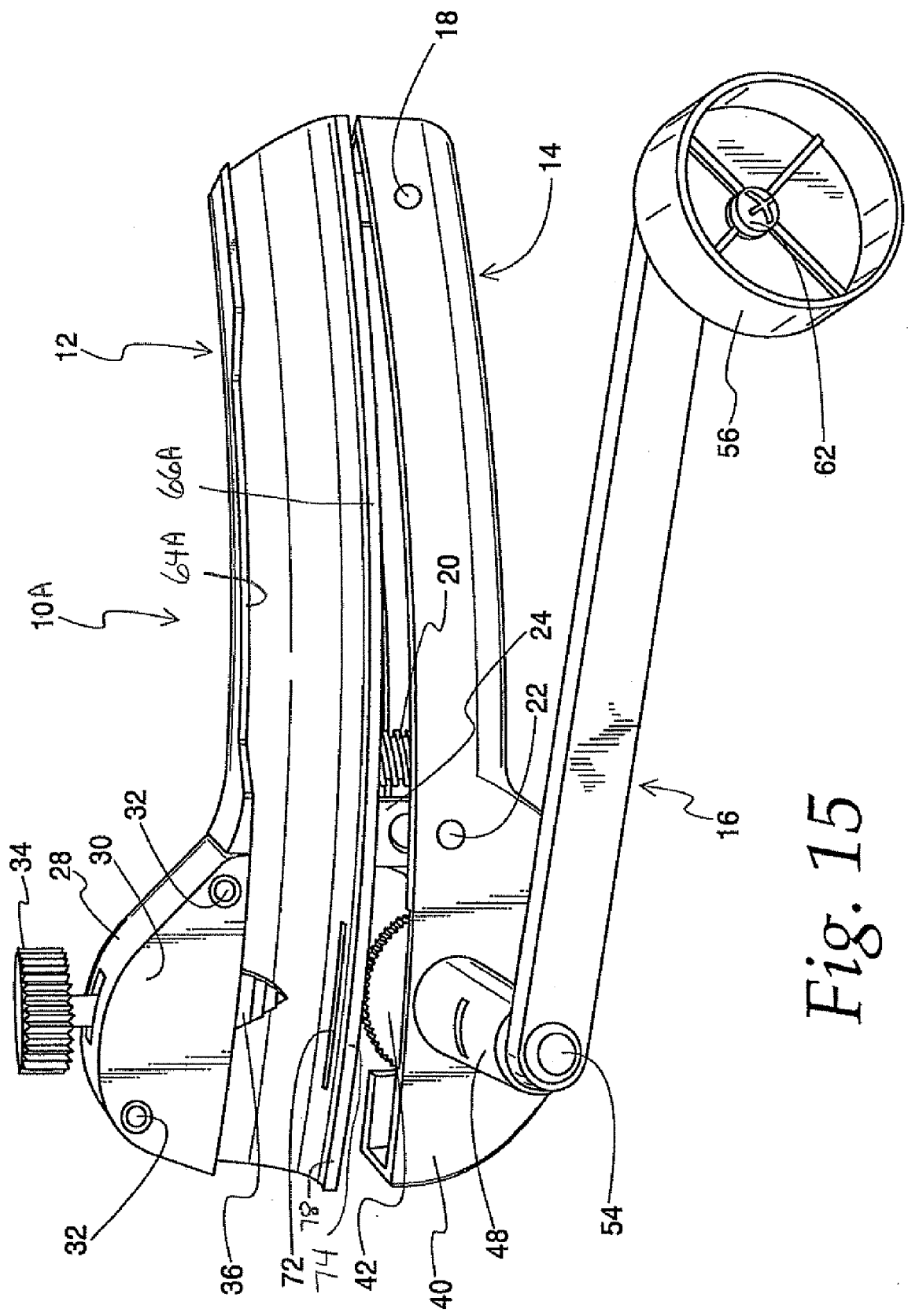
FIG. 15 is a perspective view of an armored cable cutter according to an alternate embodiment.

An alternate embodiment of the cable cutter is shown at 10A in FIGS. 15 and 16. The structure of cutter 10A is the same as cutter 10. Thus, the description of the parts will not be repeated and common parts are given common reference numerals. What is different in FIG. 15 is the orientation of the tool. It is rotated 180° about a transverse axis compared to FIG. 1. Accordingly, the top entry wall 64A and the bottom entry wall 66A are reversed from their positions in the FIG. 1 orientation. Also, the first wall 65 is on the bottom of the channel rather than on the top. The first wall 65 still includes a slot segment 74 adjacent an exit segment 78. The slot segment defines a base line 80 which is tangent to the slot segment. The bottom entry wall 66A is spaced distance X above the base line. This distance increases as the bottom entry 66A moves away from the slot segment 74. In other words, the distance in the blade insertion direction of the bottom entry wall 66A from the base line 80 increases as the longitudinal distance from the slot segment 74 increases.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein. For example, while the channel 70 is shown as a smooth, continuous curve, the channel could alternately be formed from a plurality of straight segments that are angled to one another. The desired result is that the armored cable in the channel obtains a curved configuration. Thus, it is the cable that must obtain a curved configuration in the area of the cutting blade, not necessarily the channel itself. As few as two such relatively angled channel segments could produce the necessary internal wire migration if the vertex of the angle is close to the slot segment of the first wall. In the case of a straight slot segment, the base line would be parallel to the slot segment, rather than tangent thereto as in the illustrated embodiment. If a straight entry segment were used, it would be arranged at an angle to the slot segment.

It will be evident to those skilled in the art that the separation of the top and bottom entry walls 64, 66 and the first wall 65 in the cutter body, i.e., the width of the channel 70, has to be large enough to accommodate a range of cable diameters. Thus, smaller diameter cables will not be held snugly in the channel; there will be some play or looseness of the cable in the channel prior to tightening of the stopper 36. The bottom entry walls are configured to force the stopper-restrained armored casing into the desired curved configuration that causes migration of the internal wires. The top entry wall 64 or 64A may or may not contact the stopper-restrained armored casing but the top entry wall is configured to permit the restrained armored casing to obtain the necessary curved configuration imposed by the bottom entry wall 66 or 66A. Another alternate construction of the tool may delete the top entry wall altogether and just use the bottom entry wall and the first wall to constrain the cable to the desired configuration.

I claim:

1. A cutter for cutting the armor casing of an armored cable, comprising:
    a cutter body having a first wall and top and bottom entry walls, the walls defining a channel for receiving an armored cable, the first wall having a longitudinal slot therein, the slot defining in the first wall a slot segment which defines a longitudinal base line;
    a blade handle connected to the cutter body;
    a cutting blade mounted on the blade handle on a side of the slot segment which faces away from the channel for translation into and out of the channel through the slot, the direction of translation into the channel defining a blade insertion direction; and
    wherein the entry walls are congruent such that the distance in the blade insertion direction between each entry wall and the base line increases as the longitudinal distance from the slot segment increases.

2. The cutter of claim 1 further comprising a stopper mounted on the cutter body for translation toward and away from the first wall such that the stopper is engageable with an armored cable placed in the channel to releasably press the armored cable against the slot segment of the first wall.

3. The cutter of claim 2 wherein one of the entry walls defines a gap through which the stopper extends.

4. The cutter of claim 1 wherein the first wall further comprises an exit segment located longitudinally on one side of the slot segment and wherein the exit segment of the first wall is spaced from the base line in the blade insertion direction.

5. The cutter of claim 4 wherein the entry walls are longer than the exit segment.

6. The cutter of claim 1 wherein the entry walls define a continuous arc.

7. The cutter of claim 1 wherein the cutter body further comprises a side wall joining the first and entry walls, the first, entry and side walls defining the channel.

8. The cutter of claim 1 wherein the blade handle is pivotally connected to the cutter body, the cutting blade being mounted on the blade handle.

9. The cutter of claim 8 further comprising a crank handle rotatably mounted on the blade handle, the cutting blade being connected to the crank handle for rotation therewith.

10. A cutter for cutting the armor casing of an armored cable, comprising:
    a cutter body having a first wall and top and bottom entry walls, the walls defining a channel for receiving an armored cable, the first wall having a longitudinal slot therein, the slot defining in the first wall a slot segment which defines a longitudinal base line, and wherein the entry walls are generally arcuate and congruent, both centers of the entry walls being on one side of the base line and spaced from one another;
    a blade handle connected to the cutter body; and
    a cutting blade mounted on the blade handle for translation into and out of the channel through the slot, the cutting blade being mounted such that when it is out of the channel it is substantially on the other side of the base line from the centers of the entry walls.

11. The cutter of claim 10 wherein the entry walls each defines a continuous arc.

* * * * *